US006467086B1

(12) United States Patent
Kiczales et al.

(10) Patent No.: US 6,467,086 B1
(45) Date of Patent: Oct. 15, 2002

(54) ASPECT-ORIENTED PROGRAMMING

(75) Inventors: Gregor J. Kiczales, Palo Alto; John O. Lamping, Los Altos; Cristina V. Lopes, San Francisco; James J. Hugunin, Sunnyvale, all of CA (US); Erik A. Hilsdale, Bloomington, IN (US); Chandrasekhar Boyapati, Cambridge, MA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/357,738

(22) Filed: Jul. 20, 1999

(51) Int. Cl.[7] ................................. G06F 9/44
(52) U.S. Cl. ................ 717/165; 717/163; 717/100; 717/106
(58) Field of Search .................. 717/1, 9, 2, 5, 717/100, 106, 163, 165

(56) References Cited

U.S. PATENT DOCUMENTS 5,822,593 A * 10/1998 Lamping et al. ............ 717/9
6,314,562 B1 * 11/2001 Biggerstaff ................. 717/9

OTHER PUBLICATIONS

Title: An initial assessment of aspect–oriented programming, author: Walker et al, ACM, May 1999.*
Title: Evaluating Emerging Software Development Technologies: Lessons Learned from Assessing Aspect–Oriented Programming, author: Mruphy et al, IEEE, 1999.*
Title: Platform Independentt Class Repository of TMN in Personal Communication Network using Entity–Aspect Oriented Programming, author: Park et al, IEEE, 1997.*
Title: Aspects of synchronization, author: Holmes et al, IEEE, 1997.*
Kiczales,G., Lamping, J., Mendhekar, A., Maeda, C., Lopes, C. V., Loingtier, J–M., Irwin, J., "Aspect–Oriented Programming", published in Proceedings of the European Conference on Object–Oriented Programming (ECOOP), Finland. Springer–Verlag LNCS 1241, Jun. 1997 (c) 1997.
Title: On Aspect Oriented Design—an approach to designing quality attributes, Noda et al, IEE, 1999.*
Title: Aspect oriented programming, author: Kiczales et al, ACM, Dec. 1996.*
Title: N Degrees of Separation: Multi dimensional separation of concerns, Tarr et al, ACM, 1999.*
Title: From Transience to Persistence i n Object Oriented programming patterns and architectures, Lieberherr, ACM, Dec., 1996.*
Title: Preventive Program Maintenance in Demeter/Java, author: Lieberherr et al, source: ACM, 1997.*
Title: Reuse Contracts: Managing the Evolution of Resuable Assests, Steyaert, ACM, Oct. 1996.*

* cited by examiner

*Primary Examiner*—Gregory Morse
*Assistant Examiner*—Chameli Chaudhui Das
(74) *Attorney, Agent, or Firm*—Peter Y Wang

(57) ABSTRACT

The concept of a general purpose aspect is introduced where an aspect transparently forces cross-cutting behavior on object classes and other software entities. A reusable aspect is further described for use as part of an aspect library.

10 Claims, 2 Drawing Sheets

ASPECT-ORIENTED PROGRAMMING

This invention was made with Government support under Contract F30602-97-C-0246 awarded by the Air Force. The Government has certain rights in this invention.

FIELD OF THE INVENTION

The present invention relates generally to creating software, and more particularly to aspect-oriented programming and aspect libraries.

BACKGROUND OF THE INVENTION

Procedural languages such as for Fortran, Pascal, and C are useful for defining programs where the execution is straightforward, beginning at a starting point and executing in a stepwise manner to an end. In this model, design issues can be addressed by units of contiguous program execution. Deviations from the straightforward path are provided by function calls which allow program execution to jump from the main routine to the subroutine, and back again to the main routine. The use of subroutines allows for programming efficiency for implementing common routines; however, with programs becoming increasingly more complicated, and the number of common routines also growing, programs written in procedural languages are becoming increasingly complicated and difficult to maintain.

With modem computer programs becoming increasingly long and complex creations which may have many millions of lines of code, the concept of modularity is becoming increasingly important in the development of software. With a modular approach, the various functions of a computer program may be separated into modules which various programmers can work on independently. One popular programming paradigm that embodies the concept of modularity is that of object-oriented programming (OOP).

The central idea behind object-oriented programming is the object model, where all programs are structured as collections of interrelated objects, each of which represents an instance of some class in a hierarchy of object classes.

Object-oriented programming involves defining, creating, using, and reusing "objects," which can be used to model ideas and things in terms of their features (data) and behaviors (methods). Each object is a self-contained software element including data and methods for operating on the data. Objects are created by defining object classes from which objects are created, or "instantiated." The object classes are templates for creating objects. Each object created from a particular object class includes all the data and methods of the object class, as well as data and methods from its superclasses, and different objects of the same object class may be used for different purposes. Common object-oriented programming languages include Smalltalk, C++, and Java. Object classes for implementing commonly-encountered issues are often packaged as class libraries which developers can call upon, rather than having to re-create new object classes.

Other non-OOP approaches are also commonly used, such as embodied in procedural programming languages and functional programming languages.

When design features may be cleanly divided among distinct elements, these approaches provide good support for programming those features in a modular way. However, these approaches fail to provide the proper support in certain situations, such as those involving shared resources, error handling, or other systemic issues where the same or similar functionality affects or is affected by many different elements.

The reason why these approaches are insufficient is that those issues cross-cut the primary modularization of the systems. Cross-cutting occurs when some particular concern depends on and/or must affect parts of the implementation of several of the functional modules of the system. Many cross-cuts are not weaknesses of the designs; they are a natural and unavoidable phenomena in complex systems, and they are the basis for the concept of "aspect."

Implementing those cross-cutting concerns in traditional programming languages, even object-oriented ones, typically requires scattering bits of code throughout the program, resulting in code that is tangled.

For example, non-trivial performance optimizations tend to cross-cut many modules when writing programs using traditional programming languages. So, for example, using Lisp or Java, the implementation of a cross-cutting performance optimization ends up affecting the non-optimized, modular implementation of the components in ways that are all but obvious, resulting in code that is tangled and in loss of the optimization abstraction.

SUMMARY OF THE INVENTION

An aspect is a concern that cross-cuts the primary modularization of a software system. An aspect-oriented programming language extends traditional programming languages with constructs for programming aspects. Such constructs can localize the implementation of cross-cutting concerns in a small number of special program modules, rather than spreading the implementation of such concerns throughout the primary program modules.

In order to capture the cross-cutting nature of aspects, such special program modules break the traditional rules of encapsulation in principled ways. They can affect the implementation of the primary modules without the explicit consent of those primary modules; further, they can do that for several primary modules simultaneously.

Aspect oriented programming (AOP) extends the expressive facilities available to the programmer, so that many design decisions can be expressed locally. The AOP programmer writes the base program in a traditional programming language, and also writes pieces of aspect code, each of which affects executions that are described in some parts of the base program.

In such a manner, aspect code can localize the implementation of some design patterns in a few modules, rather than spreading the fields and methods of those patterns throughout the classes, and can capture the tracing, debugging and instrumentation support for a complex system in a few modules, capture error handling protocols involving several classes in a single module, and capture resource sharing algorithms involving several classes in a single module, rather than as multiple code fragments tangled throughout the classes.

The special program modules for programming aspects enable this by cross-cutting the modularity of classes in principled ways. So one of those special program modules can affect the implementation of several classes (or several methods within a single class) in a clean, principled way. Aspect-Object interaction differs from Object-Object interaction and other traditional programming paradigms in that with the traditional approaches, all behaviors of the objects are encapsulated in the objects themselves, either as a direct implementation in the object class definition, as a request encoded in the object class definition to use the behaviors of other objects (e.g., a method call), or as a request in the object class definition to reuse the implementations of other object classes (e.g., through inheritance). Thus, in these traditional approaches, all control of an object's behavior lies with the object itself. In the AOP environment, on the other hand, a part of the object's behavior can be defined in an aspect outside of the object without the object having to request the behavior in any way. Thus, it can be said that a part of the object's behavior is transparently forced on the object by the aspect. Moreover, aspects have a more global effect in that one aspect can forces its behavior on multiple objects, possibly of different classes.

The paradigm of Aspect-Oriented Programming was first introduced in Gregor Kiczales et al., Aspect-Oriented Programming in Proceedings of the European Conference on Object-Oriented Programming (ECOOP 97), June 1997 ("Kiczalles"), which is hereby incorporated by reference. In Kiczales, a new unit of software modularity, called an aspect, was provided that appears to provide a better handle on managing cross-cutting concerns.

In Kiczales, only highly domain-specific aspect-oriented systems had been developed. There was also a goal of developing a general purpose AOP mechanism. At the time of the prior art, it was unknown how to generalize from the very specific examples of AOP to conceive of the necessary abstractions in order to create a general model. Thus, the aspect-oriented programming of the prior art w as a hypothetical paradigm having the goal of providing a clean separation between and among components and aspects.

In Kiczales, four highly domain-specific aspect-oriented systems had been developed: AML, RG, ETCML, and D. For each of these cases, a new language had to be created, and a new compiler had to be implemented. While each of these languages included a notion of an "aspect," none of these aspects could be used with any of the languages for the other three because the foundation principles underlying a general-purpose aspect language were not known. Thus, each time al new aspect-oriented application is to be created, a designer would first have to create a new language, and implement a new compiler before actually developing the software application.

The present invention presents a general-purpose aspect-oriented programming paradigm. The environment embodying the present invention is called AspectJ, and avoids the shortcomings of prior art programming paradigms. AspectJ is an extension to the Java programming language. In AspectJ, object code is encapsulated in Java classes, and aspect code is encapsulated in special program modules called "aspects".

The generalization embodied in the present invention is based on the realization that cross-cuts can be represented by capturing points in the computation, such as message sends, method definitions, object accesses, paths in sequences of calls, etc.

To improve the usefulness of aspects in simplifying software development, a library aspect is introduced which allows for the abstract implementation of AOP.

DETAILED DESCRIPTION OF THE INVENTION

The present invention is a system for facilitating the development of software programs using aspect-oriented techniques. In accordance with the present invention, the system of the present invention executes on a computer, such as a general purpose personal computer of a type well-known in the art.

Figure 1:
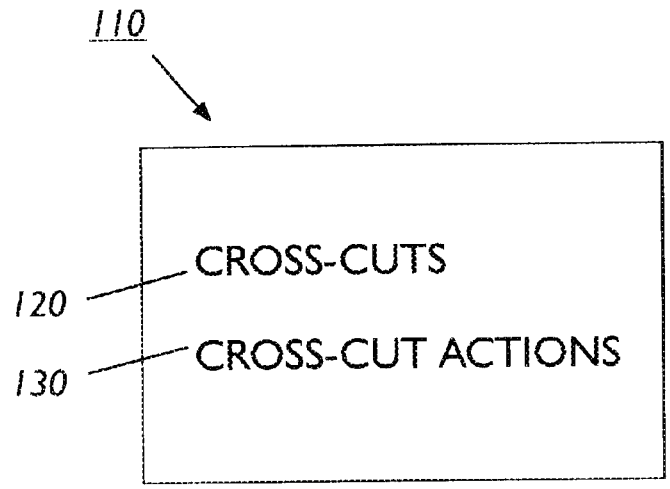
FIG. 1 illustrates an aspect according to the present invention.

Referring to FIG. 1, an aspect 110 according to the present invention provides a general way of implementing cross-cutting behavior. To do so, the aspect includes a cross-cut 120 and a cross-cut action 130. These cross-cuts can be concrete or abstract, as will be described in greater detail in conjunction with the discussion of aspect libraries, below. The cross-cut includes points in the computation where the cross-cutting action is to occur.

A point in the computation of a program is an action of the computation corresponding to a feature of the programming language in which the program is developed.

Programming languages have features that describe kinds of actions to perform. A program written in the programming language uses these features to call for specific such actions. When the program is executed, the implementation dynamically carries out a sequence of these actions in accordance with the program's instructions. Those are referred to as points in the computation.

Examples of points in the computation include reading a variable, a method invocation, the start of the execution of a method, the return from a method invocation, instantiation of an object, test of a condition, the raising of an exception, the capture of an exception, etc.

Being able to refer to an intended set of points in the computation is a key technical requirement for having a general-purpose aspect language. But such a goal is not trivial to achieve, because many of those sets of points do not have an explicit embodiment in the source code of the program. For example, objects are instantiated dynamically at run-time. Therefore denoting a method invocation on a specific object cannot be done through the use of a simple name, but must be done through denoting a variable that refers to that object and/or through enumerating properties of that object.

A general-purpose aspect language provides support for identifying sets of points of interest in the computation and for referring to them in the source code. By providing this support, the programmer can then associate one single piece of behavior with many different points in the computation.

A cross-cut action is a piece of implementation (i.e., code) that is to be executed on a cross-cut. These cross-cut actions may be implemented using common programming techniques and common programming language constructs.

Figure 2:
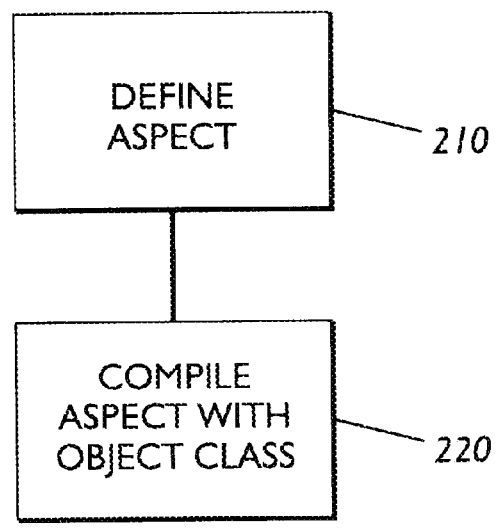
FIG. 2 is a flowchart depicting a method for creating a software program according to the present invention.

FIG. 2 illustrates the application of AOP in developing and/or modifying software. AOP can be applied to any previously developed software application for which source code is available. This can be useful for applying such functionality as system monitoring or tracing, both of which are described in greater detail in concurrently filed patent application U.S. Ser. No. 09/357,508, entitled ASPECT-ORIENTED SYSTEM MONITORING AND TRACING, which is assigned to the assignee of the present invention, and is hereby incorporated by reference into the present specification. AOP can also be applied to previously developed software to add new functionality which cross-cuts the primary functionality of the software application.

In developing new software, AOP can be used to software monitoring and tracing as described above, and can also be used to implement any other cross-cutting issues for the software application. A benefit of AOP is that the defining of aspects may be done concurrently with the development of the software entities defining the primary functionality of the software application.

In either developing or modifying, primary functionality for the software is created as one or more object classes or other program bodies. Cross-cutting functionality is added to the software through the use of an aspect. Aspects implementing cross-cutting behavior are defined at step 210. Then, in order to have the aspects force their behavior on the object classes, the aspects are compiled, at step 220, along with the object classes.

In a present embodiment of the invention, a compiler for performing the compilation of step 220 takes the source files for the aspects and object classes, and produces intermediate object classes that are then compiled into byte codes. Those skilled in the art will readily appreciate that other ways of performing the compilation are possible without departing from the spirit of the invention. For example, the composition might be done at the byte code level.

Tables 1 through 3, below, contain source code for an object class, and two aspect definitions, respectively.

TABLE 1

Source code for object class Point

```
--------- File: Point.java --------------
import java.io.*;
import java.util.*;
class Point {
    private int _x = 0;
    private int _y = 0;
    Point() {}
    void set (int x, int y) {
        _x = x; _y = y;
    }
    void setX (int x) {_x = x;}
    void setY (int y) {_y = y;}
    int getX() {return _x;}
    int getY() {return _y;}
}
```

TABLE 2

Source code for aspect ShowAccesses

```
--------- File: ShowAccesses.java --------------
import java.io.*;
aspect ShowAccesses {
    public static void main(String[] args) {
        Point p1 = new Point();
        Point p2 = new Point();
        Point p3 = new Point();
        for (int i = 0; i <= 100; i++) {
            p1.set(i, i);
            p2.set(i, i);
            p3.set(i, i);
        }
    }
    advise Point(*), Line(*) {
        static before {
            System.out.println("C");
        }
```

TABLE 2-continued

Source code for aspect ShowAccesses

```
    }
    advise * Point.getX(*), * Point.getY(*),
            * Line.getX1(*), * Line.getY1(*),
            * Line.getX2(*), * Line.getY2(*) {
        static before {
            System.out.println("R");
        }
    }
    advise * Point.set(*), * Point.setX(*), * Point.setY(*),
            * Line.set(*), * Line.setX1(*), * Line.setY1(*),
            * Line.setX2(*), * Line.setY2(*) {
        static before {
            System.out.println("W");
        }
    }
}
```

TABLE 3

Source code for aspect AutoReset

```
--------- File: AutoReset.java --------------
import java.io.*;
aspect AutoReset {
    public static void main(String[] args) {
        Point p1 = new Point();
        Point p2 = new Point();
        Point p3 = new Point();
        AutoReset a1 = new AutoReset();
        a1.addObject(p1);
        a1.addObject(p2);
        a1.addObject(p3);
        for(int i = 0; i <= 100; i++) {
            p1.set(i, i);
            p2.set(i, i);
            p3.set(i, i);
        }
    }
    int count = 0;
    advise * Point.set( . . . ), * Point.setX( . . . ), * Point.setY( . . . ) {
        after {
            if (++count >= 100) {
                System.out.println("Reseting" + thisObject + ".");
                count = -1;
                _x = 0;
                _y = ;
            }
        }
    }
}
```

Tables 4 through 6 contain code for three intermediate object classes corresponding to the object class and two aspects in Tables 1 through 3, respectively. The comments in the intermediate code of Table 4 help describe the transformation in greater detail. These are the intermediate codes generated by the preprocessing phase of the compiler.

TABLE 4

Intermediate code for object class Point

```
--------- File: ajworkingdir\Point.java --------------
import java.io.*;
import java.util.*;
class Point extends java.lang.Object {
    int _x = 0;
    int _y = 0;
```

TABLE 4-continued

Intermediate code for object class Point

```
    Point() {
    }
    /*
     * This method contains the original method body for
     * void set(int x, int y)
     * This method is called from the original method.
     */
    protected final void Point$set(int x, int y) {
        _x = x;
        _y = y;
    }
    /*
     * The body of this member was replaced by aspectj
     * At the core of this code is a call to
     * protected final void Point$set(int x, int y)
     * which holds the original method body.
     * Around this call is the code for all advise
     * weaves that apply to this member.
     */
    void set(int x, int y) {
        {
            /*
             * Generated by aspectj
             * This implements the before advice * set()
             * weave from the aspect ShowAccesses.
(ShowAccesses.java:27)
             */
            {
                java.lang.System.out.println("W");
            }
            Point$set(x, y);
            /*
             * Generated by aspectj
             * This implements the after advice * set()
             * weave from the aspect AutoReset. (AutoReset.java:24)
             */
            {
                java.util.Enumeration _enumeration = _aspects.elements();
                while (_enumeration.hasMoreElements()) {
                    java.lang.Object _thisAspect = _enumeration.nextElement();
                    if (_thisAspect instanceof AutoReset) {
                        final AutoReset thisAspect = (AutoReset)_thisAspect;
                        {
                            if (++thisAspect.count >= 100) {
                                java.lang.System.out.println("Reseting" + this + ".");
                                thisAspect.count = -1;
                                _x = 0;
                                _y = 0;
                            }
                        }
                    }
                }
            }
        }
    }
    /*
     * This method contains the original method body for
     * void setX(int x)
     * This method is called from the original method.
     */
    protected final void Point$setX(int x) {
        _x = x;
    }
    /*
     * The body of this member was replaced by aspectj
     * At the core of this code is a call to
     * protected final void Point$setX(int x)
     * which holds the original method body.
     * Around this call is the code for all advise
     * weaves that apply to this member.
     */
    void setX(int x) {
        {
            /*
             * Generated by aspectj
             * This implements the before advice * setX()
             * weave from the aspect ShowAccesses.
```

TABLE 4-continued

Intermediate code for object class Point

```
(ShowAccesses.java:27)
        */
      {
        java.lang.System.out.println("W");
      }
      Point$setX(x);
      /*
       * Generated by aspectj
       * This implements the after advice * setX()
       * weave from the aspect AutoReset. (AutoReset.java:24)
       */
      {
        java.util.Enumeration _enumeration = _aspects.elements();
        while (_enumeration.hasMoreElements()) {
          java.lang.Object _thisAspect = _enumeration.nextElement();
          if (_thisAspect instanceof AutoReset) {
            final AutoReset thisAspect = (AutoReset)_thisAspect;
            {
              if (++thisAspect.count >= 100) {
                java.lang.System.out.println("Reseting" + this + ".");
                thisAspect.count = -1;
                _x = 0;
                _y = 0;
              }
            }
          }
        }
      }
    }
  }
}
/*
 * This method contains the original method body for
 * voidsetY(int y)
   This method is called from the original method.
 */
protected final void Point$setY(int y) {
  _y = y;
}
/*
 * The body of this member was replaced by aspectj
 * At the core of this code is a call to
 * protected final void Point$setY(int y)
 * which holds the original method body.
 * Around this call is the code for all advise
 * weaves that apply to this member.
 */
void setY(int y) {
    {
      /*
       * Generated by aspectj
       * This implements the before advice * setY()
       * weave from the aspect ShowAccesses.
(ShowAccesses.java:27)
        */
      {
        java.lang.System.out.println("W");
      }
      Point$setY(y);
      /*
       * Generated by aspectj
       * This implements the after advice * setY()
       * weave from the aspect AutoReset. (AutoReset.java:24)
       */
      {
        java.util.Enumeration _enumeration = _aspects.elements();
        while (_enumeration.hasMoreElements()) {
          java.lang.Object _thisAspect = _enumeration.nextElement();
          if (_thisAspect instanceof AutoReset) {
            final AutoReset thisAspect = (AutoReset)_thisAspect;
            {
              if (++thisAspect.count >= 100) {
                java.lang.System.out.println("Reseting" + this + ".");
                thisAspect.count = -1;
                _x = 0;
                _y = 0;
              }
            }
```

TABLE 4-continued

Intermediate code for object class Point

```
            }
          }
        }
      }
    }
}
/*
 * This method contains the original method body for
 * int getX()
 * This method is called from the original method.
 */
protected final int Point$getX() {
  return __x;
}
/*
 * The body of this member was replaced by aspectj
 * At the core of this code is a call to
 * protected final int Point$getX()
 * which holds the original method body.
 * Around this call is the code for all advise
 * weaves that apply to this member.
 */
int getX() {
  int thisResult;
  {
    /*
      * Generated by aspectj
      * This implements the before advice * getX()
      * weave from the aspect ShowAccesses.
(ShowAccesses.java:20)
      */
    {
      java.lang.System.out.println("R");
    }
    thisResult = Point$getX();
  }
  return thisResult;
}
/*
 * This method contains the original method body for
 * int getY()
 * This method is called from the original method.
 */
protected final int Point$getY() {
  return__y;
}
/*
 * The body of this member was replaced by aspectj
 * At the core of this code is a call to
 * protected final int Point$getY()
 * which holds the original method body.
 * Around this call is the code for all advise
 * weaves that apply to this member.
 */
int getY() {
  int thisResult;
  {
    /*
      * Generated by aspectj
      * This implements the before advice * getY()
      * weave from the aspect ShowAccesses.
(ShowAccesses.java:20)
      */
    {
      java.lang.System.out.println("R");
    }
    thisResult = Point$getY();
  }
  return thisResult;
}
protected java.util.Vector__aspects = new java.util.Vector();
public java.util.Vector getAspects() {
  return__aspects;
}
```

TABLE 5

Intermediate code for aspect ShowAccess

```
--------- File: ajworkingdir\ShowAccesses.java --------------
import java.io.*;
class ShowAccesses extends java.lang.Object {
    public static void main(java.lang.String[] args) {
        Point p1 = new Point();
        Point p2 = new Point();
        Point p3 = new Point();
        for(int i = 0; i <= 100; i++) {
            p1.set(i, i);
            p2.set(i, i);
            p3.set(i, i);
        }
    }
}
```

TABLE 6

Intermediate code for aspect AutoReset

```
--------- File: ajworkingdir\AutoReset.java --------------
import java.io.*;
class AutoReset extends java.lang.Object {
    public static void main(java.lang.String[] args) {
        Point p1 = new Point();
        Point p2 = new Point();
        Point p3 = new Point();
        AutoReset a1 = new AutoReset();
        a1.addObject(p1);
        a1.addobject(p2);
        a1.addObject(p3);
        for (int i = 0; i <= 100; i++) {
            p1.set(i, i);
            p2.set(i, i);
            p3.set(i, i);
        }
    }
    int count = 0;
    private java.util.Vector _objects = new java.util.Vector();
    public java.util.Vector getObjects() {
       return _objects;
    }
    public void addObject(Point object) {
       if (!_objects.contains(object)) {
          object.getAspects().addElement(this);
             _objects.addElement(object);
       }
    }
    public void removeObject(Point object) {
       object.getAspects().removeElement(this);
       _objects.removeElement(object);
    }
}
```

By examining the source code examples in Tables 1 through 3, and comparing them with the intermediate code examples in Tables 4 through 6, and especially the comments in Table 4, one of ordinary skill in the art will understand the transformations necessary for implementing a compiler according to the present invention.

Aspect Libraries

With the increasing complexity of today's systems, and the increasing demand for, user-friendliness, modem software programs require a vast number of elements. Many of these elements, especially those concerned with user interfaces, and those addressing commonly faced issues, will be used over and over, both within the same software program, and for other programs. Rather than creating a new solution each time an issue reappears, a general routine for implementing the solution may be accessed from a library. Typically a software entity, which may be one or more program bodies or one or more object classes, embodying the primary functionality of the software program will include calls to a library routine. In object-oriented programming, for example, object class libraries are popular resources for developing software applications because they allow the developer to concentrate on writing code for new issues rather than having to re-create solutions that have previously been addressed by other developers in other applications.

Figure 3:
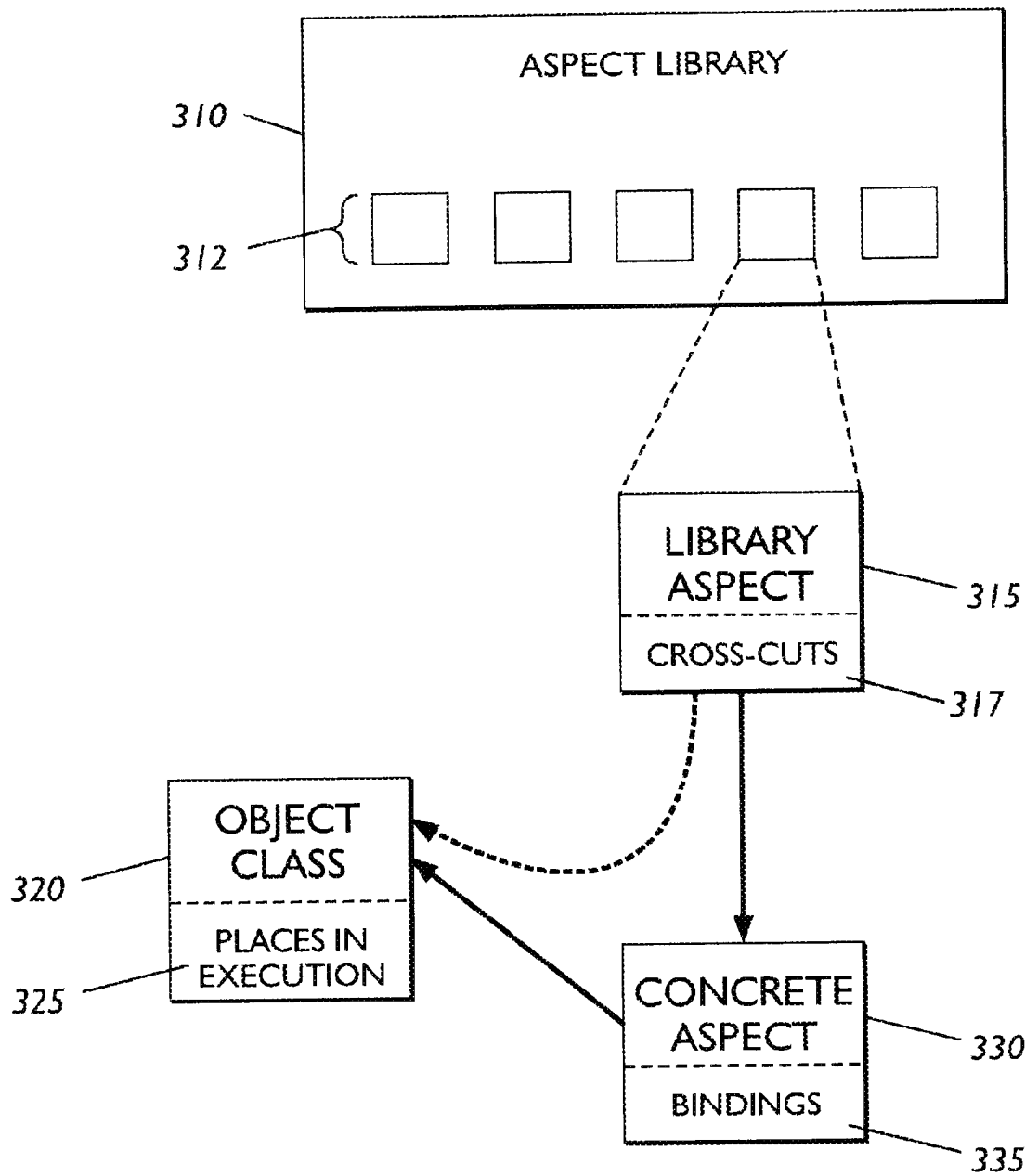
FIG. 3 depicts an aspect library according to the present invention.

Referring to FIG. 3, an aspect library 310 is shown including a number of library aspects 312. Library aspects may be concrete or abstract. A concrete library aspect is the same as the aspect 110 illustrated in FIG. 1, only packaged as part of an aspect library. It is described as being concrete because all the cross-cuts in it refer to concrete points in the computation, i.e. all the cross-cuts are bound to specific places in object classes. In a present embodiment of the invention, the concrete aspect extends the abstract library aspect through inheritance, but other ways of implementing this extension can be practiced without departing from the spirit of the invention.

The power of an aspect library lies in library aspects which are provided as abstract aspects in that their implementations can be reused for several different sets of points in the computation. An exemplary abstract library aspect 315 includes crosscut actions as in aspect 110 if FIG. 1, but the crosscut 317 of the abstract library aspect acts as a placeholder rather than being specified as a particular point in the execution.

When use of an abstract library aspect is desired, it is bound to concrete points in the execution of an object (not shown) created from object class 320 by a concrete aspect 330 defined by the developer. In the concrete aspect, the developer uses the crosscut to define bindings 335 between the names of the cross-cuts 317 in the library aspect 315 to concrete points in the execution 325 of the object class 320.

In a present embodiment of the invention, a compiler for performing the compilation of abstract cross-cuts 317 of an abstract library aspect 315 takes the source files for the object classes and the concrete and abstract library aspects, and produces intermediate object classes that are then compiled into byte codes. Those skilled in the art will readily appreciate that other ways of performing the compilation are possible without departing from the spirit of the invention. For example, the composition might be done at the byte code level, and might make use of the extensibility of Java's byte code format, e.g., tags.

Tables 7 through 9 contain source code for an abstract library aspect, a concrete aspect, and an object class, respectively.

TABLE 7

Source code for abstract library aspect MethodDebug

```
----------MethodDebug.java-----------------
aspect MethodDebug {
    abstract crosscut debugTypes;
    crosscut allMethods:* *(..) on @ debugTypes;
    static advise @ allMethods(..) {
       before {
          System.out.println("about to call"+thisJoinPoint.methodName);
       }
       after {
          System.out.println("have called"+thisJoinPoint.methodName+
                  ", returns"+thisResultObject);
       }
    }
}
```

TABLE 8

Source code for concrete aspect DebugMyClass

```
aspect DebugMyClass extends MethodDebug {
    crosscut debugTypes: on MyClass;
}
```

TABLE 9

Source code for object class MyClass

```
class MyClass {
    public void method( ) {
        System.out.println("MyClass");
    }
    public void bar(int x) {
        System.out.println("bar("+x+") on MyClass");
    }
}
```

Tables 10 through 12 contain source code for three intermediate object classes corresponding to the two aspects and the object class in Tables 7 through 9, respectively. Table 12 also contains comments which are helpful in describing the transformations. These the intermediate codes generated by the preprocessing phase of the compiler.

TABLE 10

Intermediate code for object class MethodDebug

```
---------- ajworkingdir\MethodDebug.java ----------------
class MethodDebug extends java.lang.Object {
}
```

TABLE 11

Intermediate code for object class DebugMyClass

```
---------- ajworkingdir\DebugMyClass.java ----------------
class DebugMyclass extends MethodDebug {
}
```

TABLE 12

Intermediate code for object class MyClass

```
---------- ajworkingdir\MyClass.java ----------------
class MyClass extends java.lang.Object {
    protected final void MyClass$method$signature( ) {
        java.lang.System.out.println("MyClass");
    }
    public void method( ) {
    {
        /*
         * Generated by aspectj
         * This implements the before advice * * ( )
         * weave from the aspect MethodDebug. (LibTest.java:13)
         */
        {
            java.lang.System.out.println("about to call " + "method");
        }
        MyClass$method$signature( );
        /*
         * Generated by aspectj
         * This implements the after advice * * ( )
         * weave from the aspect MethodDebug. (LibTest.java:16)
         */
        {
            java.lang.System.out.println("have called" + "method" + ",
```

TABLE 12-continued

Intermediate code for object class MyClass

```
returns " + ((java.lang.Object)null));
        }
    }
}
protected final void MyClass$bar$signature(int x) {
    java.lang.System.out.println("bar(" + x + ") on MyClass");
}
public void bar(int x) {
    {
        /*
         * Generated by aspectj
         * This implements the before advice * * ( )
         * weave from the aspect MethodDebug. (LibTest.java:13)
         */
        {
            java.lang.System.out.println("about to call " + "bar");
        }
        MyClass$bar$signature(x);
        /*
         * Generated by aspectj
         * This implements the before advice * * ( )
         * weave from the aspect MethodDebug. (LibTest.java:16)
         */
        {
            java.lang.System.out.println("have called " + "bar" ", returns
" + (java.lang.Object)null));
        }
    }
}
}
```

By examining the source code examples in Tables 7 through 9, and comparing them with the intermediate code examples in Tables 10 through 12, and especially the comments in Table 12, one of ordinary skill in the art will understand the transformations necessary for implementing a compiler according to the present invention.

While the present invention has been described in relation to an object-oriented environment, those skilled in the art will appreciate that these techniques may readily be applied to other programming paradigms without departing from the spirit and scope of the present invention.

What is claimed is:

1. An aspect program operating in an aspect-oriented programming environment, the aspect program being stored on a medium readable by a computer system, the aspect program implementing aspect concerns that cross-cut a software entity, the software entity defining an overall functionality of a software application program stored on a medium readable by the computer system and comprising one of at least one program body and at least one object class, the aspect program comprising:

a) a cross-cut that comprises a point in the execution where cross-cutting behavior is to be included; and
   b) a cross-cut action comprising a piece of implementaton associated with the cross-cut, the piece of implementaton comprising computer readable program code that implements the cross-cutting behavior; wherein the cross-cut action transparently forces the cross-cutting behavior on the software entity.

2. The aspect of claim 1, wherein the cross-cut defines a plurality of points in the computation associated with a plurality of places in the software entity.

3. A method for developing software using only one general purpose aspect programming language for an aspect-oriented programming environment in a computer system, the method comprising:

a) creating a software entity on a computer readable medium, the software entity comprising one of at least one program body and at least one object class and defining an overall functionality of a software application program;

b) creating an aspect program on a computer readable medium, the aspect program implementing aspect concerns that cross-cut the overall functionality of the software entity, the aspect program modifying the software entity by forcing a behavior on the software entity, wherein the modification is transparent to the software entity; and c) compiling the software entity along with the aspect program to force the behavior of the aspect onto the software entity.

4. The method of claim 3, wherein creating an aspect comprises:

1) creating a cross-cut defining a point in the computation where cross-cutting behavior is to be included; and 2) creating a cross-cut action comprising a piece of implementation associated with the crosscut, the piece of implementation comprising code that implements the cross-cutting behavior.

5. The method of claim 4, wherein the cross-cut is a concrete cross-cut that uniquely defines a point in the computation where cross-cutting behavior is to be included.

6. The method of claim 4, wherein:

the computer system further includes an aspect library including a library aspect; and creating the cross-cut comprises creating a concrete aspect that reuses parts of an implementation of the library aspect.

7. The method of claim 6, wherein the cross-cut defines a plurality of points in the computation associated with a plurality of places in the software entity.

8. An aspect library for use in a computer system having a processor, memory, and an aspect-oriented operating environment, the aspect library for use in creating a software program, the software program comprising one or more software entities that define the overall functionality of the software program, each of the one or more software entities comprising one or more program bodies or one or more object classes, each of the one or more software entities comprising computer readable program code which performs one or more functions, the aspect library comprising a plurality of aspects, each aspect comprising:

a) a placeholder for specifying a cross-cut that comprises a point in the execution of the software entity where cross-cutting behavior is to be included; and b) a cross-cut action comprising a piece of implementation associated with the cross-cut, the piece of implementation comprising code that implements the cross-cutting behavior; wherein the cross-cut action transparently forces the cross-cutting behavior on the software entity.

9. A computer-readable medium for use in a computer system having a processor, a display, and memory, the memory including an aspect-oriented operating environment, the computer-readable medium having computer program code embedded therein, the computer program code including an aspect library comprising a plurality of aspects, each aspect comprising:

a) a placeholder for specifying a cross-cut that comprises a point in the execution where cross-cutting behavior is to be included; and b) a cross-cut action comprising a piece of implementation associated with the cross-cut, the piece of implementation comprising computer readable program code that implements the cross-cutting behavior; wherein the cross-cut action transparently forces the crosscutting behavior on a software entity.

10. A method for transferring a computer program product from one or more first computers to a second computer connected to the one or more first computers through a communications medium, the computer program product comprising at least one aspect included in an aspect library, the aspect library being stored on the one or more first computers, the method comprising:

a) accessing, on the one or more first computers, the aspect library comprising a plurality of aspects, each aspect comprising:

1) a placeholder for specifying a cross-cut that comprises a point in the execution where cross-cutting behavior is to be included; and 2) a cross-cut action comprising a piece of implementation associated with the cross-cut, the piece of implementation comprising computer readable program code that implements the cross-cutting behavior; wherein the cross-cut action transparently forces the cross-cutting behavior on a software entity; and b) transferring the computer program product from the one or more first computers to the second computer.

* * * * *